United States Patent [19]

Woodruff

[11] 4,032,245

[45] June 28, 1977

[54] AGRICULTURAL EQUIPMENT CLAMP

[75] Inventor: Henry C. Woodruff, Phoenix, Ariz.

[73] Assignee: Gramor Machine Company, Tolleson, Ariz.

[22] Filed: July 9, 1976

[21] Appl. No.: 703,847

[52] U.S. Cl. .............................. 403/385; 172/763
[51] Int. Cl.² ......................................... F16B 7/00
[58] Field of Search .......... 403/385, 400, 386, 389; 172/763

[56] References Cited

UNITED STATES PATENTS

| | | | |
|---|---|---|---|
| 3,550,969 | 12/1970 | Robinson | 403/8 |
| 3,825,358 | 7/1974 | Eisenhardt | 403/385 X |

Primary Examiner—Andrew V. Kundrat
Attorney, Agent, or Firm—Berman, Aisenberg & Platt

[57] ABSTRACT

An agricultural equipment clamp comprising a clamp body and a cooperating cap which are cast from a lightweight aluminum alloy. The body and cap each include V-shaped notches for seating a tool bar therebetween. The body comprises a pair of spaced parallel side plates between which a tool shank is positionable. The base of the spaced plates are connected by an integrally formed block which has a pair of bolt-receiving apertures formed at the respective ends thereof which align with cooperating apertures formed in the clamp cap for securing the clamp to the tool bar. The head of the pair of bolts serve as the means for seating the tool shank. The top of the spaced plates are connected by an integrally formed connecting block which has a set screw positioned therethrough for urging the tool shank against the spaced seats. A nut-receiving slot is integrally formed in the top connecting block and includes means for automatically aligning a nut to threadingly receive the setscrew therethrough.

15 Claims, 4 Drawing Figures

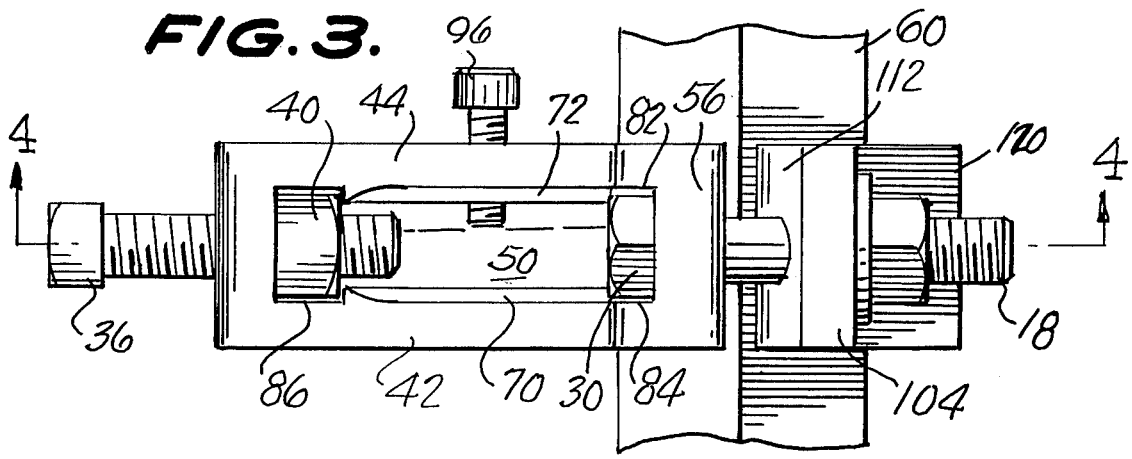
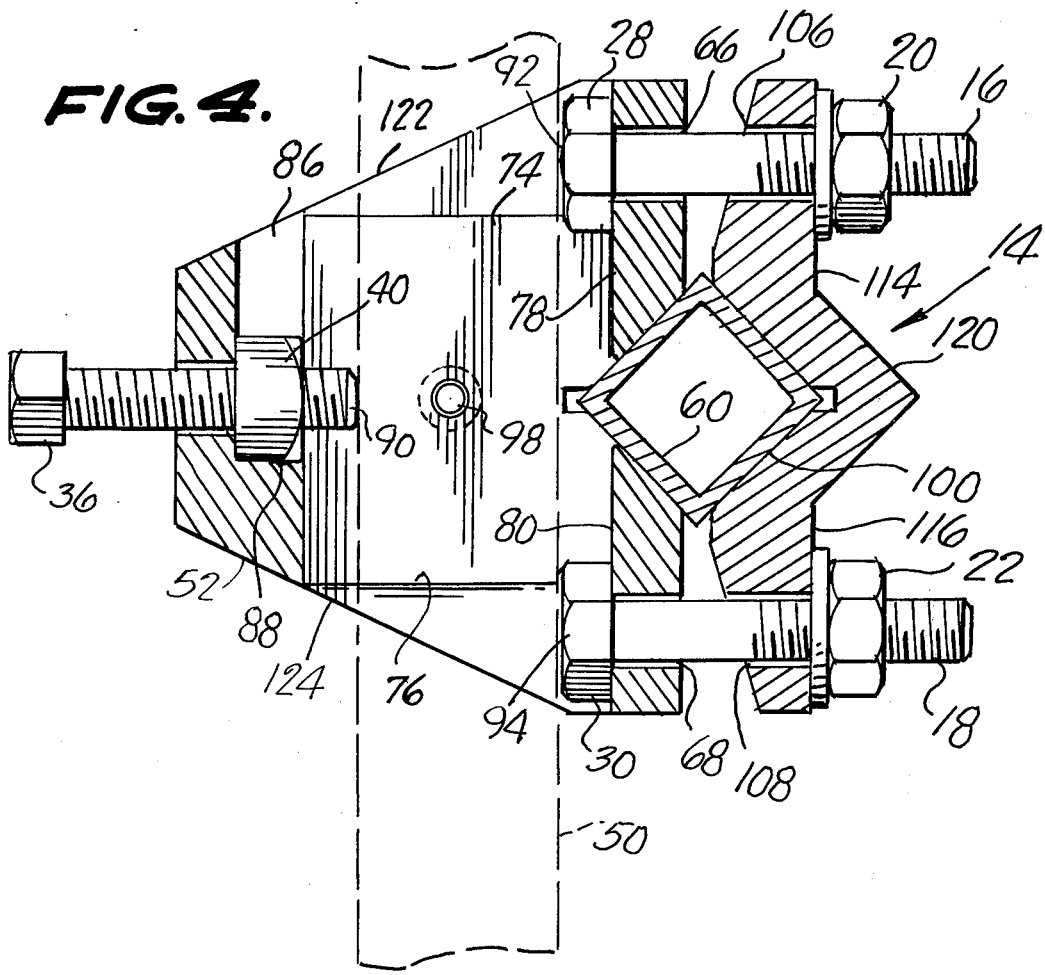

AGRICULTURAL EQUIPMENT CLAMP

BACKGROUND OF THE INVENTION

1. Field of the Invention

The present invention is related to agricultural equipment clamps, and more particularly, is directed towards a tool bar clamp which is utilized in agricultural machinery for attaching the shank of a ground-working tool to the tractor mounted tool bar.

2. Description of the Prior Art

The general class of agricultural equipment clamps to which the present invention belongs is well known. In conventional usage, such clamps are utilized as means for interconnecting ground-working tools with a tractor or other motive machine. Generally speaking, such machines utilize a square sectioned hollow tool bar which extends transversely to the direction of travel of the machine. A plurality of agricultural equipment clamps are connected to the square tool bar along the length thereof. The clamps generally include means for securing a generally rectangular shank of an earth-working tool thereto in a transverse, generally vertical, relationship to the tool bar.

The shanks of the tools secured in the clamps extend downwardly to their respective earth-working implements, the shanks generally positioned rearwardly of the tool bar. In a typical agricultural machine such as a cultivator, there may be as many as eighty such clamps secured to a single tool bar for supporting eighty earth-working implements.

In view of the foregoing, it may be appreciated that the construction, strength, and weight of each individual clamp can be of paramount importance in calculating the overall efficiency of the agricultural machinery. The design of such clamps must be such as to easily withstand the torques generated about the tool bar while maintaining the earth-working implement in the desired position. Further, the design should preferably enable quick and easy adjustments of the height of the tool shank, as well as permit easy changing of shanks should the associated implement require repair. Such clamps must be able to withstand large forces, as well as provide positive clamping of both the tool bar and tool shank during use. The clamp should preferably be impervious to outdoor weather conditions, and be designed with sufficient structural rigidity so as to withstand externally provided impact forces or shocks which may be imparted thereto.

Weight considerations are of particular significance. Prior art agricultural equipment clamps of the type described have generally been formed of cast steel which has resulted in a total weight of approximately six to eight pounds per clamp. When one takes into account the large number of clamps which may be utilized on a single of machinery, weight considerations are significant in terms of the total wear and tear on the machinery, the total power and fuel required to operate same, and the general difficulty encountered in manually handling heavy equipment. It can therefore be appreciated that any savings in weight in the design of such clamps would be highly desirable, provided that structural integrity and reliability were maintained.

U.S. Pat. No. 3,550,969 to Robinson illustrates a typical prior art agricultural equipment clamp of the general class described hereinabove. Robinson's clamp is characterized by a pair of closely spaced tool shank seats 28 and 29 formed internally of the clamp body, the outer portions of which serve as the body's V-shaped tool bar seat. The tool bar is secured betwen the cap and the body by a pair of bolts which extend through cooperating bolt ears which extend laterally from both the body and clamp. A shank set screw extends through the top of the body to urge the tool shank against its respective seats 28 and 29.

While generally being an improvement over clamps previously known, the Robinson clamp nevertheless suffers from several deficiencies. One of the deficiencies concerns the casting of the clamp out of steel, which results in a rather heavy product that cumulatively increases wear and tear, requires greater power and fuel, increases ground compaction, and generally reduces efficiency. Further, the Robinson design provides a tool shank seat comprised of a pair of closely spaced seating points which tend to withstand less torque than would be the case if such points were more widely separated. Other deficiencies include the requirement for at least two tools in order to tighten the cap to the body of the clamp, as well as the difficulty encountered in properly aligning the set screw nut over the set screw aperture in the back spacing block. Finally, the bolt ears of the Robinson design can be subjected to severe shocks and forces which tend to fracture and break the ears from the clamp body.

OBJECTS AND SUMMARY OF THE INVENTION

It is therefore a primary object of the present invention to provide a new and improved agricultural equipment clamp which overcomes all of the deficiencies noted above with respect to prior art clamps.

Another object of the present invention is to provide an agricultural equipment clamp which is preferably cast of an aluminum alloy which results in a product of significantly reduced weight when compared with the prior art steel clamps, without any sacrifice in structural integrity.

An additional object of the present invention is to provide an improved agricultural equipment clamp of a reduced weight which results in less ground compaction, less power required in the agricultural machine, considerable savings in fuel, and significantly less wear and tear on the agricultural equipment in general.

A still further object of the present invention is to provide an agricultural equipment clamp which is formed of a cast aluminum alloy which results in improved strength, longer life, and greater operating efficiency.

Another object of the present invention is to provide a new and improved clamp for agricultural equipment which efficiently mounts a tool bar transversely to a tool shank, and provides a tool shank seat which greatly improves the torque-resisting capabilities of the clamp.

A further object of the present invention is to provide an improved agricultural equipment clamp which is simplified in use in requiring only a single tool to mount the clamp onto a tool bar.

A still further object of the present invention is to provide an agricultural tool clamp which incorporates a unique means for automatically aligning the set screw nut to threadingly receive the tool shank set screw.

A further object of the present invention is to provide an improved agricultural equipment clamp which incorporates an auxiliary means for insuring the right angle longitudinal seating of the tool shank with respect to the tool bar.

The foregoing and other objects are attained in accordance with one aspect of the present invention through the provision of an agricultural equipment clamp which comprises a unitary body having means for seating a tool shank and a first means integrally formed therein for seating a tool bar transversely to the tool shank. The clamp also includes a unitary cap having integrally formed therein second means for seating the tool bar at a position opposite to the first tool bar seating means. The cap also includes first aperture means located near the ends of the cap for receiving means for securing the clamp about the tool bar. The clamp is characterized in that the tool shank seating means comprises the means for securing the clamp about the tool bar.

In accordance with other aspects of the present invention, means are integrally formed in the body of the tool clamp for receiving means for urging the tool shank against the tool shank seating means. The unitary body of the agricultural equipment clamp comprises a pair of spaced substantially parallel side plates joined at the ends thereof by a top connecting block and by a bottom connecting block, respectively, which side plates define means for receiving the tool shank therethrough. The top connecting block has integrally formed therein said means for receiving the tool shank urging means, while the bottom connecting block includes means integrally formed therein for receiving the tool shank seating means. The last-named means comprises a pair of second apertures which are in substantial alignment with the first apertures formed in the clamp's cap. The means for securing the clamp about the tool bar preferably comprises first and second bolts each having a bolt head and an associated nut, the bolts being positioned through the first and second apertures formed in the cap and body.

In accordance with yet other aspects of the present invention, the pair of side plates of the clamp body include means integrally formed therein adjacent the second apertures for securing the bolt heads in a non-rotative manner therein. The tool shank seating means preferably comprises the bolt heads of the first and second bolts, and the tool shank urging means preferably comprises a set screw positioned through an aperture formed in the top connecting block, and a nut positioned in a nut-receiving slot integrally formed in the top connecting block for threadingly securing the set screw therethrough.

In accordance with yet other features of the present invention, the nut-receiving slot for the set screw comprises an opening slot to receive the nut and positioned adjacent the means for receiving the tool shank, stop means also being provided adjacent said aperture within the clamp body for insuring proper alignment of the nut within the slot to receive the set screw. The nut-receiving slot is preferably formed in the clamp body transversely to the tool bar.

In accordance with still further aspects of the present invention, means are provided which extend through one of the side plates of the clamp body for urging the tool shank against the opposite side plate, said urging means preferably comprising a second set screw threadingly received through said said plate.

In accordance with still further features of the present invention, the agricultural clamp is preferably comprised of a lightweight aluminum alloy, the side plates of which comprehend and enclose the first and second bolt means positioned therebetween.

BRIEF DESCRIPTION OF THE DRAWINGS

Various objects, features and attendant advantages of the present invention will be more fully appreciated as the same becomes better understood from the following detailed description thereof when considered in connection with the accompanying drawings, in which:

FIG. 3 is a side view of the preferred embodiments clamp illustrated in FIG. 2; and FIG. 4 is a cross-sectional view of the preferred embodiment of the agricultural equipment clamp of the present invention taken along line 4—4 of FIG. 3.

DETAILED DESCRIPTION OF THE PREFERRED EMBODIMENT

Figure 1:
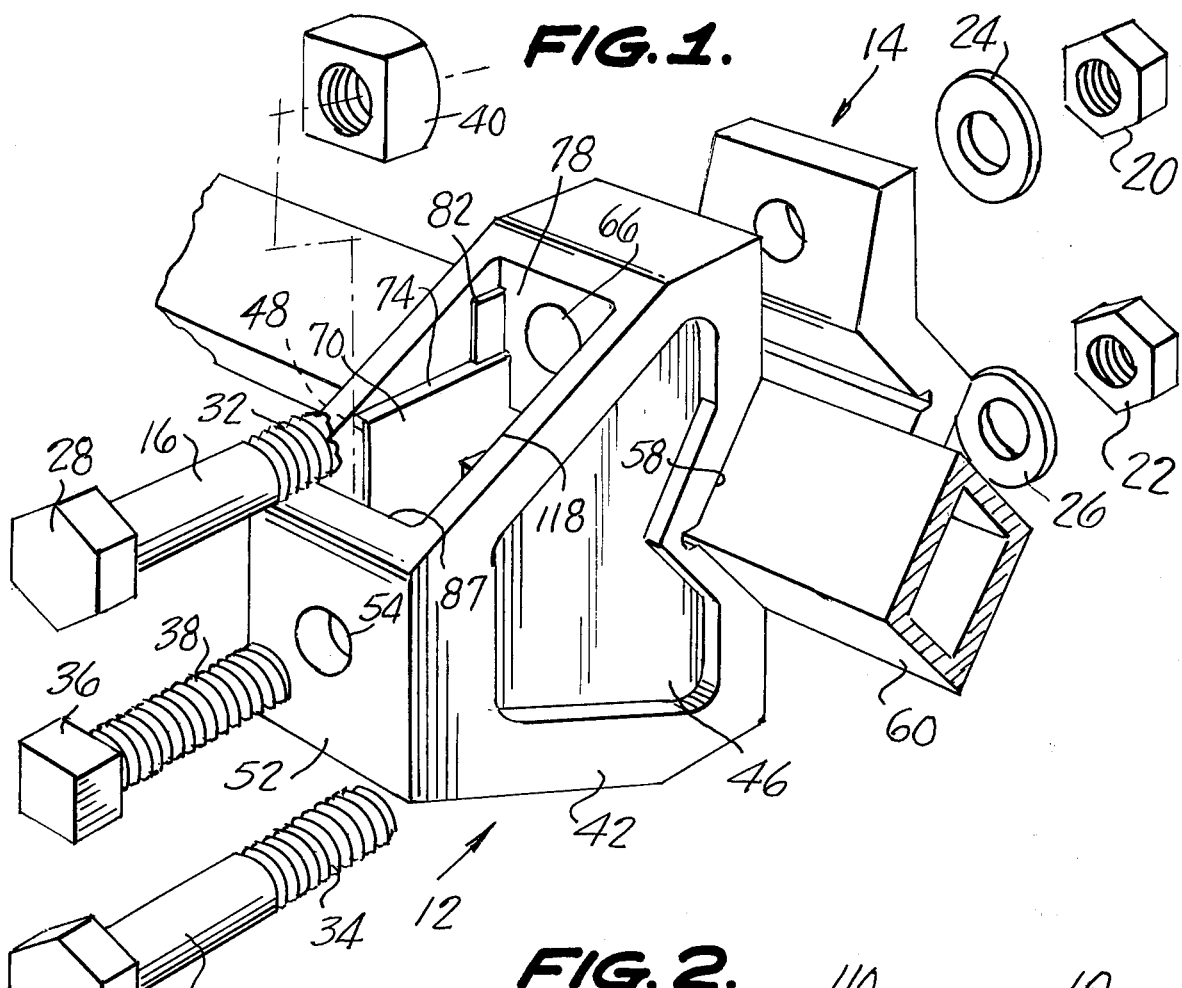
FIG. 1 is an exploded view in perspective illustrating the main components which comprise a preferred embodiment of the agricultural equipment clamp of the present invention.
Figure 2:
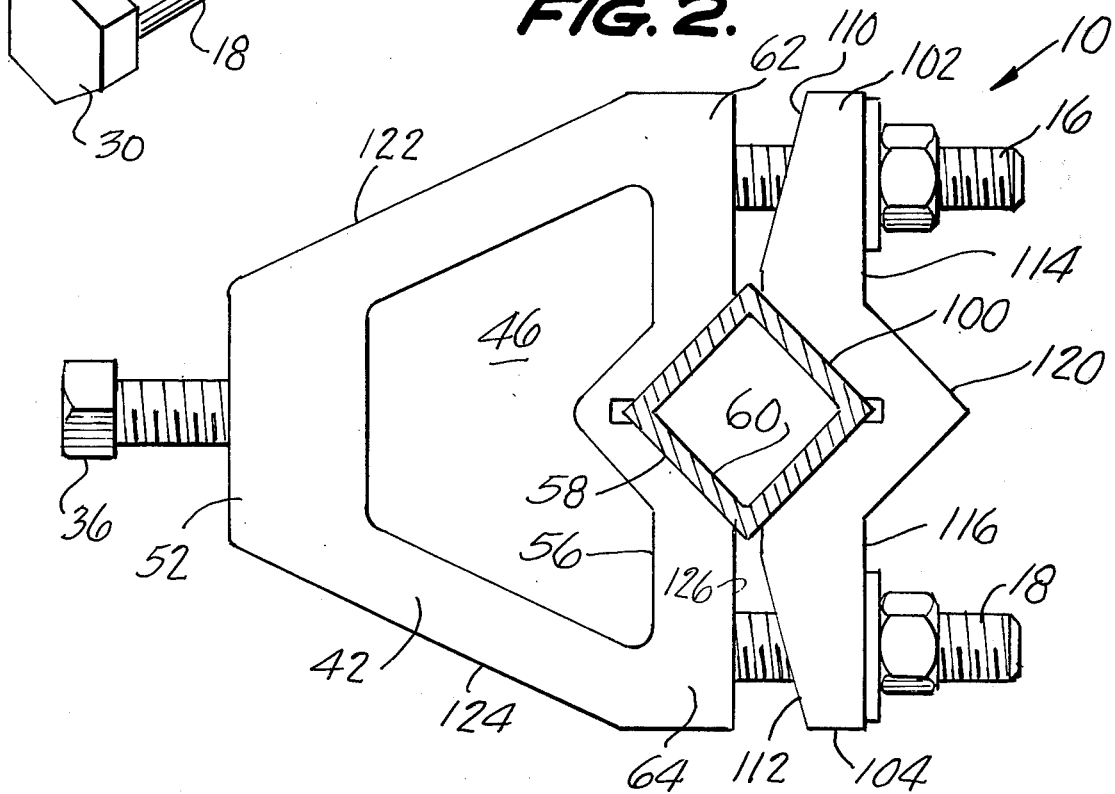
FIG. 2 is a plan view of the preferred embodiment of the present invention when assembled.

Referring now to the drawings, wherein like reference numerals designate identical or corresponding parts throughout the several views, and more particularly to FIGS. 1 and 2 thereof, there is illustrated a preferred embodiment of the agricultural equipment clamp of the present invention which is indicated generally by the reference numeral 10.

Clamp 10 includes a body 12 which is integrally cast of an aluminum alloy, and a cap 14, also cast as a unitary piece. A pair of cap-retaining bolts 16 and 18 extend through suitably formed and aligned apertures in the body 12 and cap 14 and include threaded ends 32 and 34 for receiving nuts 20 and 22, respectively. A pair of washers 24 and 26 may be utilized for bolts 16 and 18, respectively, which are also characterized by hexagonal head portions 28 and 30, respectively.

The clamp 10 also includes a shank set screw 36 which includes a threaded portion 38 for engaging a suitably sized set screw nut 40.

The body 12 and cap 14 of clamp 10 are designed to fit about a generally square and hollow tool bar 60. Body 12 of clamp 10 is adapted to receive a generally rectangular tool shank 50 to which a ground-working implement is connected at the bottom thereof in a conventional fashion. The alignment of the tool shank 50 and tool bar 60 is perhaps best illustrated in FIG. 4 which depicts their transverse alignment, clamp 10 being illustrated in its upright or working position.

Tool bar 60 extends transversely and laterally across the machinery to which it is connected, and a plurality of tool clamps 10 are adapted to be connected to tool bar 60 in a conventional fashion and similar to the manner illustrated in FIG. 1.

The clamp body 12 comprises a pair of substantially parallel lateral side plates 42 and 44 each of which has an indented outer wall portions 46 and 48, respectively. Side plates 42 and 44 are joined at the top portion thereof by a connecting block 52. Connecting block 52 includes an aperture 54 formed therein which receives the tool shank set screw 36.

The lower portion of the parallel side plates 42 and 44 are connected by an integrally formed bottom connecting block 56. Bottom connecting block 56 is itself comprised of a centrally formed V-shaped tool bar seat 58 from each side of which extends an integrally formed bolt support members 62 and 64. As best viewed in FIG. 4, a pair of apertures 66 and 68 are provided in bolt supports 62 and 64 for receiving bolts 16 and 18, respectively.

Referring now to FIG. 3, the inner walls of parallel side plates 42 and 44 include inwardly extending indented portions 70 and 72 which are substantially complementary to the indented outer wall portions 46 and 48, respectively. Side wall indentations 70 and 72 are designed to define a tool shank receiving slot 118 (FIG. 1). Each of the indented wall portions 70 and 72 have longitudinal edges 74 and 76, respectively, which broadly define a pair of slots for receiving bolts 16 and 18, respectively.

The bolt support members 62 and 64 of the bottom connecting block 66 include a pair of planar upper surfaces 78 and 80 against which the heads 28 and 30 of bolts 16 and 18 seat. As illustrated in FIGS. 1 and 3, extending adjacent the upper flat surfaces 78 and 80 as well as from the lateral edges 74 and 76 of the inner walls 70 and 72 are a pair of plates 82 and 84 for securing the bolt heads 28 and 30 when seated thereadjacent against rotational movement. There are included a pair of plates for each bolt head, the pair of plates for bolt head 30 of bolt 18 not being illustrated. In this fashion, the edges 74 and 76 of indentations 70 and 72 of the inner walls of side plates 42 and 44 cooperate with the bolt head securing plates 82 and 84 such that the heads 28 and 30 are prevented from rotating once seated against the upper flat surfaces 78 and 80 of the bolt supports 62 and 64, respectively. In this fashion, bolts 16 and 18 may be secured to body 12 and cap 14 with a single tool for tightening nuts 20 and 22, respectively.

A further feature of the clamp body 12 resides in the provision of a nut-receiving slot 86 formed in the top connecting block 52 (FIG. 4). Slot 86 has an opening 87 which is adjacent the shank opening 118 formed between the side plates 42 and 44. As illustrated in FIG. 4, the slot 86 extends approximately only two-thirds the width of connecting block 52 so as to provide an integrally formed seat 88 which serves as a stop member to automatically align nut 40 in position to threadingly receive set screw 36. One only need drop nut 40 into opening 87 of slot 86 in the schematic manner illustrated in FIG. 1, and proceed to tighten set screw 36 as desired. The slot 86 holds nut 40 in position, and also prevents rotation thereof.

Referring once more to FIG. 3, an auxiliary set screw 96 may be provided through a threaded hole 98 in the indented wall portion 72 of side plate 44. Side set screw 96 serves, when positioned in the manner illustrated in FIG. 3, to urge tool shank 50 against the opposing surface 70 of the inside of the side plate 42. This promotes accurate right-angle alignment of tool shank 50 with respect to tool bar 60, and thereby increases the clamping efficiency of the device.

The cap 14 of the clamp of the present invention is characterized by a centrally formed V-shaped tool bar seat 100 which is complementary and oppositely disposed to the corresponding tool bar seat 58 of the body 12.

Tool bar seat 100 of cap 14 is reinforced by a V-shaped central portion 120. Extending laterally from the central portion 120 are the wing portions 102 and 104 of cap 14, each of which include a bolt-receiving aperture 106 and 108 therein. Apertures 106 and 108 are in substantial alignment with corresponding apertures 66 and 68 formed in the adjacent portion of clamp body 12.

Cap 12 includes a pair of flat outer surfaces 114 and 116 against which the washers 24 and 26 of bolts 16 and 18 are firmly seated. The opposite surfaces 110 and 112 of cap 14 are characterized by a tapering from the inner tool bar engaging portion thereof to the outer end forming portions. This provides added strength in the area of tool bar 60, as well as economy of material in the overall design.

It may be seen from FIG. 4 that the upper edge 122 of body 12 is tapered from the upper connecting block 52 down to the lower connecting block 56, as is the lower edge 124, in such a fashion that the parallel side plates 42 and 44 encompass and comprehend the bolt support portions 62 and 64 of the bottom connecting block 56. This design adds further strength to the entire clamp structure, and obviates the prior art problem of bolt ear breakage.

FIG. 4 provides an illustration of the greater resistance to rotational torque provided by the design of the present invention. It can be seen that the tool shank seats 92 and 94 are provided by the heads 28 and 30 of bolts 16 and 18, respectively. The toll shank 50 is urged against its seats 92 and 94 by virtue of the tightening of the set screw 36 against point 90. It can be seen that the tool shank seats 92 and 94 are widely spaced in such a fashion so as to provide an effective resistance against rotation of the clamp about tool bar 60 when subjected to reverse rotational torque. The wide contact points 92 and 94 provide better leverage and more uniform clamping action than heretofore possible.

The design of the present invention provides a more reliable clamp in that the tool shank 50 sets square against the heads of bolts 16 and 18, which are the same bolts which hold the clamp 10 to the square tool bar 60. This results in an interdependence of the two clamping actions thereby providing a synergistic effect of improving the individual clamping actions by virtue of their interdependence.

The present invention lends itself to several advantages over previously suggested clamps. Firstly, by virtue of the aluminum alloy construction, a tremendous reduction in weight is achieved, the preferred embodiment illustrated in FIG. 1 weighing only 2½ pounds overall. In a typical cultivator that utilizes 80 of such clamps, this is a net savings of approximately 400 pounds in the machine, which results in less ground compaction, less power required to drive the machine, a tremendous savings in fuel, and less wear and tear on rubber and other portions of the equipment. The weight reduction saves and economizes during all portions of the usage of the clamp, from manufacturing and shipping, to final use on the agricultural machine.

As a result of the aluminum construction, the clamp of the present invention may be utilized in any environment by virtue of its inherent rust resistance, thereby providing a longer and more reliable lifetime of use. The integral one-piece cast construction eliminates seams in the portions that mate with the tool bar and tool shank to further increase the strength of the clamp. The novel set screw nut-receiving slot provides easy alignment of the nut and the setscrew to facilitate adjustment and changing of tool shanks, while inherently adding strength to the entire clamp structure. The heads of the cap tightening bolts are seated in integrally formed slots formed within the clamp and will not rotate once seated, thereby requiring only a single wrench to mount the clamp onto the tool bar. Further, the bolt-holding portion of the body is integral there-with and is protected by the side plates of the body so as to prevent breakage and provide greater strength to the overall clamp. The auxiliary set screw may also be provided if desired as a further means for insuring proper right angle alignment and seating of the tool shank with respect to the tool bar.

Obviously, numerous modifications and variations of the present invention are possible in light of the above teachings. It is therefore to be understood that within the scope of the appended claims the invention may be practiced otherwise than as specifically described herein.

I claim as my invention:

1. An agricultural equipment clamp, which comprises:
   a unitary body having means for seating a tool shank and first means integrally formed thereon for seating a tool bar transversely to said tool shank;
   a unitary cap having integrally formed therein second means for seating said tool bar at a position opposite to said first means and first aperture means located near the ends of said cap for receiving means for securing said clamp about said tool bar;
   wherein said tool shank seating means comprises said means for securing said clamp about said tool bar.

2. The agricultural equipment clamp as set forth in claim 1, further comprising means integrally formed in said body for receiving means for urging said tool shank against said tool shank seating means.

3. The agricultural equipment clamp as set forth in claim 2, wherein said unitary body comprises a pair of spaced substantially parallel side plates joined at the ends thereof by a top connecting block and by a bottom connecting block, respectively, which side plates define means for receiving said tool shank therethrough.

4. The agricultural equipment clamp as set forth in claim 3, wherein said means for receiving said tool shank urging means is integrally formed in said top connecting block, and wherein said bottom connecting block includes means integrally formed therein for receiving said tool shank seating means.

5. The agricultural equipment clamp as set forth in claim 4, wherein said means for receiving said tool shank seating means comprises second aperture means which are in substantial alignment with said first aperture means formed in said cap when in use.

6. The agricultural equipment clamp as set forth in claim 5, wherein said means for securing said clamp about said tool bar comprises first and second bolt means, each having a bolt head and an associated nut, which are positioned through said first and second aperture means.

7. The agricultural equipment clamp as set forth in claim 6, wherein said pair of side plates include means integrally formed therein adjacent said second aperture means for securing said bolt heads non-rotatively therein.

8. The agricultural equipment clamp as set forth in claim 7, wherein said tool shank seating means comprises said bolt heads of said first and second bolt means.

9. The agricultural equipment clamp as set forth in claim 4, wherein said tool shank urging means comprises a set-screw positioned through an aperture formed in said top connecting block, and a nut positioned in a nut-receiving slot integrally formed in said top connecting block for threadingly securing said set screw therethrough.

10. The agricultural equipment clamp as set forth in claim 9, wherein said nut-receiving slot comprises an opening sized to receive said nut and positioned adjacent said means for receiving said tool shank, and stop means positioned adjacent said aperture within said clamp body for insuring proper alignment of said nut within said slot to receive said set screw.

11. The agricultural equipment clamp as set forth in claim 10, wherein said nut-receiving slot is formed in said clamp body transversely to said tool bar when clamped thereby.

12. The agricultural equipment clamp as set forth in claim 3, further comprising means extending through one of said side plates for urging said tool shank against the opposite side plate.

13. The agricultural equipment clamp as set forth in claim 12, wherein said tool shank urging means comprises a set screw threadingly received through said one side plate.

14. The agricultural equipment clamp as set forth in claim 6, wherein said first and second bolt means are positioned within said pair of spaced side plates.

15. The agricultural equipment clamp as set forth in claim 1, wherein said agricultural clamp is comprised of aluminum.

* * * * *